United States Patent [19]

Yudow

[11] Patent Number: 4,706,651
[45] Date of Patent: Nov. 17, 1987

[54] SOLAR SOLIDS REACTOR

[75] Inventor: Bernard D. Yudow, Chicago, Ill.

[73] Assignee: The United States of America as represented by the United States Department of Energy, Washington, D.C.

[21] Appl. No.: 832,617

[22] Filed: Feb. 24, 1986

[51] Int. Cl.[4] ............................................. F24J 2/00
[52] U.S. Cl. .............................. 126/451; 126/450; 126/417; 432/120; 432/121; 432/200
[58] Field of Search ............... 432/120, 121, 194, 200, 432/201, 202; 34/93, 179, 182, 203; 126/451, 450, 438, 417

[56] References Cited

U.S. PATENT DOCUMENTS

| | | | |
|---|---|---|---|
| 1,575,470 | 3/1926 | Weber et al. | 432/194 |
| 1,957,347 | 5/1934 | McKinnon | 432/200 |
| 2,550,948 | 5/1951 | Tusson | 34/137 |
| 2,604,059 | 7/1952 | Warrington | 432/194 |
| 3,849,063 | 11/1974 | Eichenlaub | 432/194 |
| 3,972,316 | 8/1976 | Alkauab | 126/417 |
| 4,120,646 | 10/1978 | Groff et al. | 432/121 |
| 4,222,987 | 9/1980 | Keller | 432/121 |
| 4,224,286 | 9/1980 | Murase et al. | 432/194 |
| 4,229,184 | 10/1980 | Gregg | 126/438 |
| 4,284,839 | 8/1981 | Johnson | 126/438 |
| 4,365,615 | 12/1982 | McIvin | 126/438 |
| 4,432,344 | 2/1984 | Bennington et al. | 126/438 |
| 4,443,186 | 4/1984 | Shell | 126/417 |
| 4,596,527 | 6/1986 | Yamada et al. | 432/121 |
| 4,619,244 | 10/1986 | Marks | 126/451 |
| 4,627,418 | 12/1986 | Gibson et al. | 126/451 |

FOREIGN PATENT DOCUMENTS 0126810 1/1901 Fed. Rep. of Germany ...... 432/194

Primary Examiner—Samuel Scott
Assistant Examiner—H. A. Odor
Attorney, Agent, or Firm—L. E. Carnahan; Roger S. Gaither; Judson R. Hightower

[57] ABSTRACT

A solar powered kiln is provided, that is of relatively simple design and which efficiently uses solar energy. The kiln or solids reactor includes a stationary chamber with a rearward end which receives solid material to be reacted and a forward end through which reacted material is disposed of, and a screw conveyor extending along the bottom of the chamber for slowly advancing the material between the chamber ends. Concentrated solar energy is directed to an aperture at the forward end of the chamber to heat the solid material moving along the bottom of the chamber. The solar energy can be reflected from a mirror facing at an upward incline, through the aperture and against a heat-absorbing material near the top of the chamber, which moves towards the rear of the chamber to distribute heat throughout the chamber. Pumps at the forward and rearward ends of the chamber pump heated sweep gas through the length of the chamber, while minimizing the flow of gas through an open aperture through which concentrated sunlight is received.

20 Claims, 5 Drawing Figures

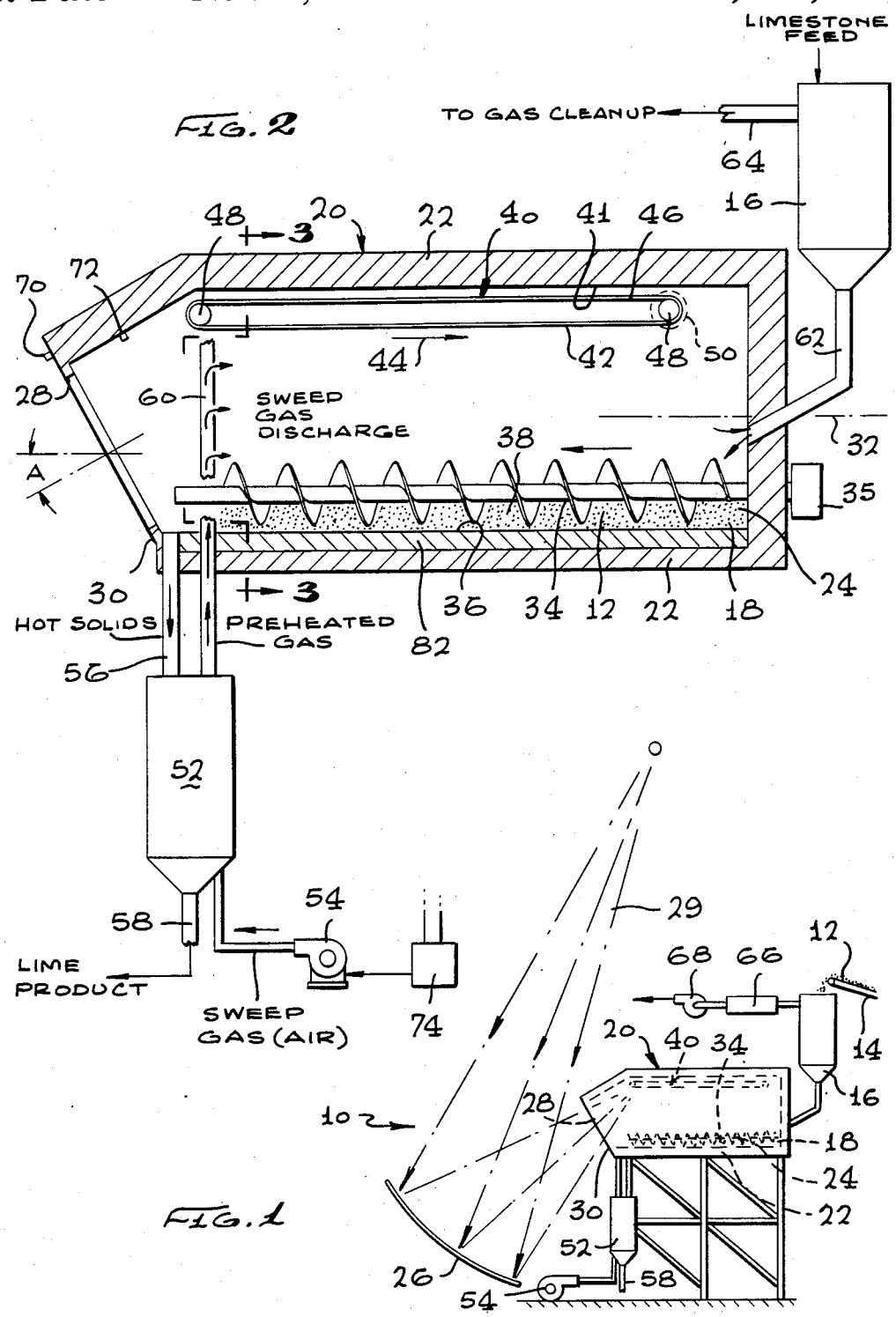

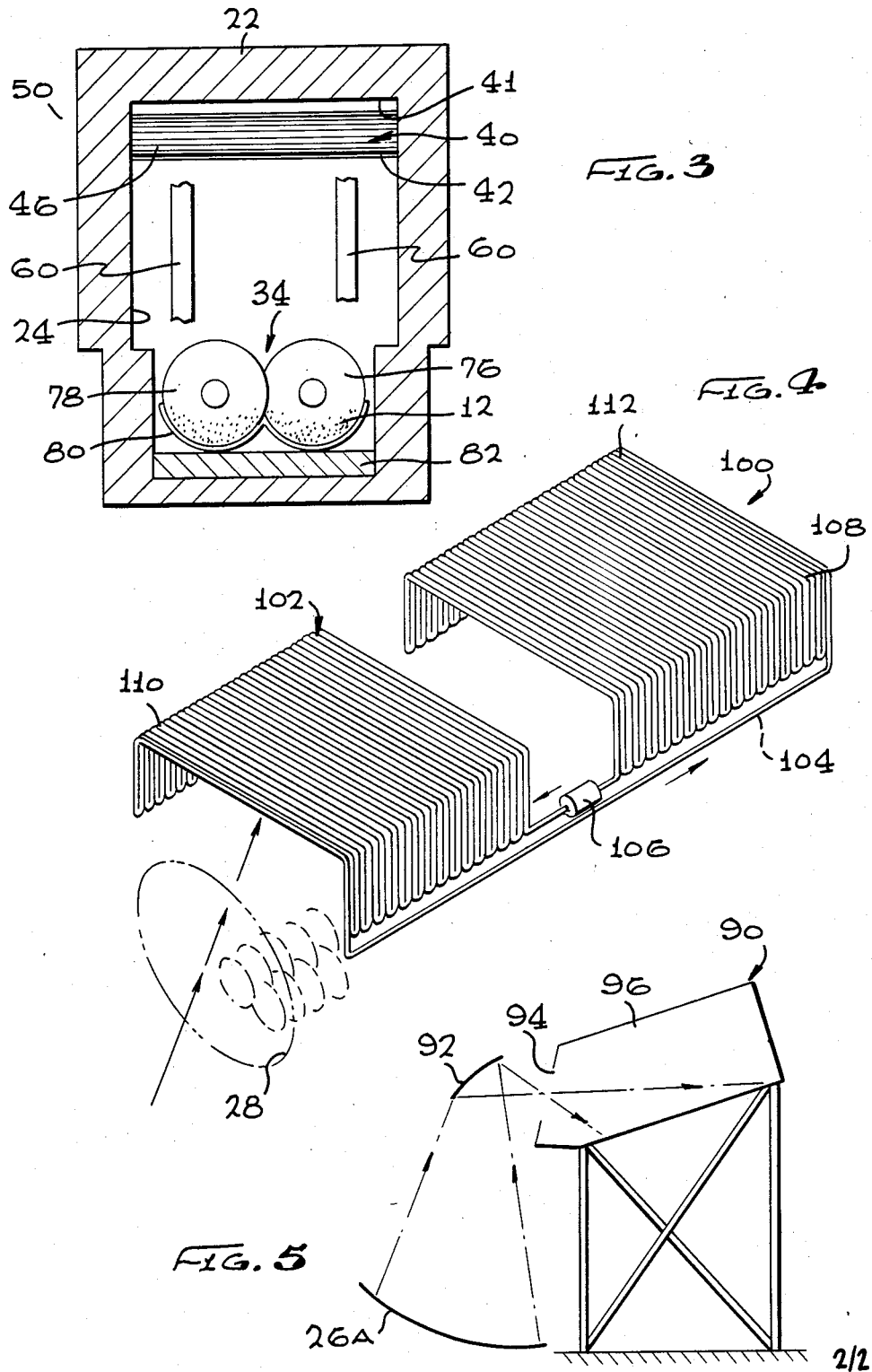

SOLAR SOLIDS REACTOR BACKGROUND OF THE INVENTION

The Government has rights in this invention pursuant to Contract No. DE-AC03-82SF11662 awarded by the U.S. Department of Energy.

Kilns are used as solid reactors, as for the calcination (heating without binding) of calcium carbonate, to turn limestone feed into a lime product. Some or all of the heating energy can be obtained from concentrated sunlight. A typical prior art kiln includes a chamber that continually rotates about a largely horizontal axis while solids fed into its rearward end slowly advance towards the forward end from which they are removed. A sweep gas, such as air, may also flow along the length of the chamber to maintain a low partial pressure of carbon dioxide above the reactants. One type of prior art solar kiln is shown in U.S. Pat. No. 4,443,186 by Shell. This approach uses a rotary kiln similar to prior art gas-fired kilns, and a glass or other window through which solar energy passes to heat the entire length of material in the kiln. There are several problems that arise with such a solar powered kiln. The continuous rotation of the kiln results in repeated heating and cooling of the refractory kiln lining. Also, it results in large amounts of dust which coat the glass window and/or prevent more than shallow penetration of solar energy into the kiln. While solar energy can be directed largely horizontally or at a downward angle, it is commonplace to concentrate light from an upwardly-directed reflector, so that concentrated light is moving at an upward incline. A solar powered kiln, or solids reactor, which avoided many of the problems which arise from attempts to use primarily prior art fossil-fired kiln technology, would be of considerable value.

SUMMARY OF THE INVENTION

One object of the invention is to provide an efficient solar reactor.

Another object is to provide a means for distributing heat of solar energy throughout a solid reactor.

Another object is to provide a means for preventing the passage of a heated sweep gas through a reactor chamber while resisting the passage of gas through an open aperture in the chamber.

In accordance with one embodiment of the invention, a solar powered solids reactor is provided, which enables efficient utilization of concentrated solar energy. The solids reactor can include a substantially stationary elongated chamber through which solid materials slowly move between its rearward end and its forward end. A linear conveyor can be used to move the material in a layer at the bottom of the chamber, slowly between its opposite ends, while the top of the layer is exposed to receive heat created by solar radiation.

An aperture, which can be formed in the forward end portion of the chamber, receives concentrated solar energy. The solar energy may be reflected at an upward incline through the aperture, and a solar radiation heat-absorbing material can be located near the top of the chamber to receive the energy and redistribute the heat while minimizing reradiant losses through the aperture. The heat-receiving material can move along the length of the chamber to better distribute the heat to portions of the layer near the rearward end of the chamber. The aperture can be an opening through which air can move, and heated sweep gas may be not only pumped out of the rearward end of the chamber, but also pumped in near the forward end of the chamber at a rate that minimizes the flow of air or other gas either into or out of the chamber through the aperture.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified side elevation view of a solar powered solids reactor constructed in accordance with one embodiment of the invention.

FIG. 2 is a sectional view of the reactor of FIG. 1.

FIG. 3 is a view taken on the line 3—3 of FIG. 2.

FIG. 4 is a partial perspective view of another solar powered reactor which includes a heat exchanger.

FIG. 5 is a simplified view of another solar powered reactor wherein solar energy enters the chamber at a downward incline.

DESCRIPTION OF THE PREFERRED EMBODIMENTS

FIG. 1 illustrates a reactor system 10 for thermally reacting a solid material 12 which is shown being fed by a conveyor belt 14 into a hopper 16. The solid material is fed from the hopper 16 to the rearward end 18 of a chamber 20 which has walls 22 forming a chamber 24. Solar radiation is concentrated by a reflector 26, to pass through an aperture 28 in the chamber device, to heat the solid material to thermally react it. The reacted solid material is removed from the forward end 30 of the chamber.

As also shown in FIGS. 2 and 3, the walls 22 of the chamber are substantially fixed in position, in that they do not rotate about the length of the chamber as indicated by line 32, as do most prior art kilns or reactors. Instead, a screw conveyor 34 including a plurality of intermeshing screws turned by a motor 35 moves the material slowly along the bottom 36 of the chamber from the rearward end portion or end 18 to the forward end portion or end 30. The screw conveyor moves the solid material 12 to be reacted as a layer 38 whose top is exposed to receive heat by radiation (as well as by convection). It is possible to use other linear conveyor means such as a ram or conveyor belt to move the solids in a layer along the bottom of the chamber, although a screw has the advantage that it continually stirs the material to bring portions of the material at the bottom of the layer up to the top. Projections can be placed along the screw to help in such agitation. The bottom of the chamber is slightly inclined from the horizontal, with the forward end lower than the rearward end, to aid in material movement.

The aperture 28 faces at a downward angle A of about 20° from the horizontal. This aids in the transmission of solar radiation from the solar reflector or concentrator 26, which faces at an upward incline in order to reflect sunlight 29 which is moving at a downward incline. Although it is possible to use another reflector to reflect sunlight horizontally or even at a downward angle through an aperture, this complicates the solar collection system. The concentrated sunlight passing through the aperture 28 falls on a regenerator 40 that is located near the top 41 of the chamber. The regenerator includes a solar radiation absorbing structure 42 within the chamber, and above the level of the layer 38 of solid material. This absorbing structure 42 can move between a forward location at which it receives concentrated sunlight which has passed at an upward inclined through the aperture to the chamber, in a rearward direction 44 to a more rearward location. At the forward location, the structure 42 becomes very hot, and at the rearward location, the very hot structure redistributes heat by radiation and convection to heat the rearward portion of the layer 38.

The movement of the heat-absorbing material of the structure 42 is valuable for several reasons besides distribution of heat. The moving structure 42 minimizes the reradiation of heat out through the aperture. It avoids overheating of the top and sides of the chamber because of the movement, and avoids fracture of itself from repeated heating and cooling because it is not a continuous refractory structure (it can be lined with refractory material, but with such material in separated small pieces). The structure 32 also reflects a considerable amount of the solar radiation directly down towards the layer 38 of solid material. The structure 42 includes pieces of a refractory material on a conveyor belt 46 which extends about a pair of rollers 48, with the rearwardmost roller being slowly rotated by a motor 50.

A variety of regenerators 40 can be used, including a reflector near the forward end of the chamber, which is cooled by the forward end of a heat pipe whose rearward end is coupled to the rear of the chamber to distribute some of the heat thereto. FIG. 4 illustrates a system 100 with a heat exchanger device 102, wherein the moving heat-absorbing material is a fluid 104 circulated by a pump 106 through pipes 108. Sunlight passes through an aperture 28 to heat a forward hot end 110 of the heat exchanger and the fluid therein. The hot fluid serves to heat a colder rearward end 112 of the heat exchanger, to heat the rearward end portion of the layer of material to be reacted.

While the aperture 28 of FIGS. 1-4 can include a solid but transparent or translucent window to minimize the passage of ambient cooling air into the chamber, the aperture is preferably an air aperture which is devoid of any solid barrier to the passage of air therethrough. Although the amount of dust in the reactor chamber is reduced by the use of a linear conveyor, instead of continually rotating the chamber, considerable dust is still created which would tend to coat any solid window at the aperture. Also, a solid window would tend to become heated by the concentrated solar radiation passing therethrough.

Sweep gas, such as air, is passed in a rearward direction 44 (FIG. 2) between the forward and rearward end portions of the chamber. The sweep gas limits the partial pressure of gases such as carbon dioxide above the solid material which is reacting, to avoid slowing of the reaction by such gases. The sweep gas also entrains fines to prevent their escape through the aperture. The sweep gas is heated in a contact cooler 52 through which ambient air is pumped by a pump 54. Hot solids formed by solid material which has passed along the length of the chamber, is dispensed through a conduit 56 into the contact cooler 52 before the solids are discharged through a discharge 58. The sweep gas is heated by the hot solids in the cooler, and is discharged through pipes 60 lying in the forward end portion of the chamber.

Sweep gas which has passed through the length of the chamber, enters a feed conduit 62 and passes through the hopper 15 to a sweep gas outlet 64. During passage through the feed conduit 62 and hopper 16, the further heated sweep gas gives up some of its heat to preheat the solid material which is fed into the chamber. The sweep gas outlet 64 leads to a gas cleanup apparatus 66, and is pumped by a second pump 68 into the environment. The gas clean up apparatus 66 can include clean up devices such as a bag house scrubber or electrostatic percipitator.

If just the outlet air pump 68 were used, a vacuum would be created in the chamber, which would draw in large amount of unheated air through the aperture 28. If just the first air pump 54 were present, a pressure somewhat in excess of atmospheric would be created in the chamber, which would result in considerable heated air and fines being blown into the atmosphere. The combination of both air pumps permits the maintenance of a pressure in the chamber, or at least at the forward end of the chamber, which is very close to that of the atmosphere, to minimize the passage of gas (and/or fines) through the open aperture. The pressure at the forward end 30 of the chamber can be more precisely controlled by a pair of pressure sensors 70, 72, one located in the ambient atmosphere and the other within the chamber forward end portion, whose differential pressure is used to operate a control 74 that controls the first air pump 54. The air pump is controlled to maintain a substantially zero pressure difference. The location of the sweep gas discharge pipes 60 results in any small amounts of gas passing out through the aperture tending to be heated gas from the pipe 60, rather than gas deeper in the chamber which includes fines.

As shown in FIG. 3, the chamber 24 is of largely rectangular cross-section. The screw conveyor 34 includes two intermeshed screws 76, 78 with a casing 80 around them to confine the solids to locations where they will be moved by the screws. Applicant has designed a system of the type shown in FIGS. 1-3, wherein the walls 22 of the chamber include an outer casing of carbon steel of one-quarter inch thickness, walls of fiber ceramic insulation, and a floor lining 82 of high alumina firebrick to withstand erosion. It is possible to use the high alumina firebrick to form the casing 80 that maintains the solids in contact with the screws. The screws are of INCOLOY 800 H material which resists corrosion and erosion. The system was designed as a calcinator to turn limestone feed into a lime product, but can be used for a variety of purposes. Where dangerous material is to be reacted, it may be necessary to place a transparent window over the aperture.

FIG. 5 illustrates another reactor system 90, wherein the solar radiation concentrated by the collector 26A is diverted by another mirror 92 to pass through an aperture 94 directly against a layer of material at the bottom of the chamber device 96. While such a system can be developed, it has a disadvantage that a secondary reflector 92 is required, whose orientation must be controlled with high precision. The reactors of FIGS. 1-5 can include a cover which fits over the aperture, to maintain the system hot when no sunlight is used, when the system may stand idle, or when gas or other fuel may be used to continue the reaction.

Thus, the invention provides a solar powered solids reactor of relatively simple design but high effectiveness. Instead of rotating the entire chamber, a linear conveyor is used at the bottom of the chamber to move solids along the length of the chamber. The system can receive solar energy moving at an upward incline, by the use of a regenerator which includes material which receives heat near the front of the chamber and which moves to the rearward portion of the chamber where it gives up heat. A sweep gas passes along the length of the chamber, but the flow of air through the aperture is minimized by using an inlet pump which pumps air into the forward end portion of the chamber, and an outlet pump which pumps air out of the rearward end of the chamber.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A solar powered solids reactor, comprising:
   walls forming a chamber having rearward and forward end portions, side portions, and a top and bottom, said forward end portion being at an angle with respect to vertical;
   means supporting said walls in a substantially fixed position so the chamber cannot continually rotate;
   means for feeding solid material which is to be thermally reacted into said rearward end portion of said chamber;
   means coupled to said forward end portion of said chamber for receiving solid material after it has been at least partially reacted in said chamber
   said chamber walls having a aperture which passes solar radiation into said forward end portion of said chamber;
   means for directing concentrated solar radiation through said aperture onto at least the top of said chamber;
   means located in said top of said chamber for receiving said solar radiation and for directing heat created by said solar radiation towards the bottom of said chamber; and
   linear conveyor means located adjacent the bottom of said chamber for moving material received at said rearward end portion of said chamber, in a layer, along the bottom of the chamber to said forward end portion, while maintaining a top of the layer exposed to receive said heat created by said solar radiation.

2. The reactor described in claim 1 wherein:
   said conveyor means comprises a screw feed which includes at least one screw extending along the bottom of the chamber and means for turning the screw, to stir and move the layer.

3. The reactor described in claim 1, wherein:
   said bottom of said chamber is constructed to include a downward incline with respect to horizontal,
   said means for directing concentrated solar radiation includes a window located in said aperture and which faces at a steeper downward incline than the bottom of said chamber, and
   said means for directing directs concentrated solar radiation through said window at an upward incline with respect to the bottom of said chamber.

4. The reactor described in claim 1 wherein:
   said solar heating means includes a solar radiation heat-absorbing material located within said chamber above the bottom of said chamber, means for directing sunlight through said aperture toward said heat-absorbing material to heat it, and means for moving said heat-absorbing material at least partially along the length of said chamber, whereby to distribute heat and avoid overheating of said heat-absorbing material.

5. The reactor described in claim 1 wherein:
   said aperture is open to the passage of ambient air therethrough, and additionally including:
   means for transferring heat between a gas and solid material in said means for receiving solid material to produce a preheated sweep gas;
   first means for pumping gas out of the rearward end portion of the chamber, and
   second means for pumping said preheated sweep gas into the forward end portion of said chamber at a location rearward of said aperture, said first and second pumping means being operated at a rate which maintains a pressure substantially equal to ambient atmosphere, whereby to minimize the inflow of ambient air through said aperture.

6. Solar powered solids reactor apparatus comprising:
   walls forming an elongated chamber having rearward and forward ends, side portions, and a top and bottom;
   means for feeding solid material which is to be thermally reacted into said rearward end of said chamber;
   means coupled to said forward end of said chamber for receiving solid material after it has been at least partially reacted in said chamber;
   means for moving solid material in a layer along the bottom of said chamber from its rearward end to its forward end, while maintaining a top of said layer exposed to receive heat created by solar radiation;
   the forward end of said chamber being at an angle with respect to vertical and having an aperture therein;
   a sunlight reflecting concentrator positioned to direct concentrated sunlight through said aperture into said chamber;
   a regenerator which includes a solar heat absorbing material within said chamber above the level of said layer of solid material, and means for moving said heat absorbing material between a first location, at which it receives concentrated sunlight which has passed through said aperture into said chamber, to a second location, which is closer to said rearward end of said chamber than is said first location, and at which it gives up heat.

7. The apparatus described in claim 6 wherein:
   said regenerator includes a belt extending in a closed loop with one end of the loop being closer to the forward end of the chamber than the other end of the loop, and means for moving said belt along said loop.

8. The apparatus described in claim 6 wherein:
   said regenerator includes a pipe with a portion extending between said first and second locations, and said heat absorbing material includes a fluid in said pipe, said regenerator including means for flowing said fluid between said locations.

9. A solar powered solids reactor, comprising:
   walls forming an elongated chamber having a rearward end portion, an inclined forward end portion and a top and bottom, said chamber walls also having an aperture in said inclined forward end portion through which sunlight and ambient air can pass;
   means for feeding solid material to be thermally reacted into said rearward end portion of said chamber, means for moving solid material at least partially along a length of the chamber, and means for disposing of at least partially reacted solid material from said forward end portion of said chamber;

means for directing solar radiation through said aperture into said chamber;

means for transferring heat between at least partially reacted solid material and a sweep gas for heating the sweep gas;

means for passing said sweep gas into said forward end portion of said chamber and at least partially along the length of said chamber and out from said rearward end portion of said chamber, including a first gas pump coupled to said rearward end of said chamber to pump gas out of said chamber, and a second gas pump coupled to said forward end of said chamber to pump said sweep gas into said chamber, whereby to minimize the inflow of ambient air through said aperture and the outflow of heated sweep gas through said aperture.

10. The reactor described in Claim 9 including:

means responsive to a difference in pressure between ambient air and gas in said forward end portion of said chamber, for controlling said second pump to substantially maintain a substantially zero pressure difference between the ambient air and the gas.

11. The reactor described in claim 9, wherein said means for feeding solid material includes a hopper operatively connected to an opening in said rearward end portion of said chamber, and means for directing solid materials into said hopper.

12. The reactor described in claim 9, wherein said means for moving solid material includes a conveyor means positioned along a length of the bottom of said chamber.

13. The reactor described in claim 9, wherein said means for disposing of at least partially reacted solid material includes a contact cooler operatively connected to said forward end portion of said chamber and to a sweep gas supply means.

14. The reactor described in claim 9, additionally including a lining of material capable of withstanding erosion positioned on the bottom of said chamber.

15. The reactor described in claim 9, wherein said forward end portion of said chamber is inclined at an angle with respect to vertical.

16. The reactor described in claim 9, additionally including a window positioned in said aperture.

17. The reactor described in claim 9, wherein said means for transferring heat includes a contact color operatively connected to said chamber adjacent said forward end portion to receive at least partially reacted solid material, and a pump operatively connected to said contact cooler for directing sweep gas through said contact cooler, causing heating of the sweep gas, and into said chamber.

18. The reactor described in claim 9, additionally including means for controlling flow of sweep gas into said chamber.

19. The reactor described in claim 9, additionally including a regenerator located within said chamber and adjacent said top of said chamber for receiving solar radiation and for heating solid material moving along the length of the chamber.

20. The reactor described in claim 19, wherein said regenerator comprises a moving belt of heat-absorbing material, and means for rotating said moving belt, such that when said moving belt passes near said forward end portion of said chamber the heat-absorbing material is heated by solar radiation passing through said aperture into said rearward end portion of said chamber heat from said heat-absorbing material is distributed along the length of said chamber for heating solid material moving along the length of said chamber.

* * * * *